(12) United States Patent
Hsieh et al.

(10) Patent No.: US 10,992,166 B2
(45) Date of Patent: Apr. 27, 2021

(54) VEHICLE REDUNDANT ENERGY SYSTEM

(71) Applicant: Lyft, Inc., San Francisco, CA (US)

(72) Inventors: Chen-yu Hsieh, San Jose, CA (US); Catalin Popovici, San Jose, CA (US)

(73) Assignee: Lyft, Inc., San Francisco, CA (US)

( * ) Notice: Subject to any disclaimer, the term of this patent is extended or adjusted under 35 U.S.C. 154(b) by 54 days.

(21) Appl. No.: 16/362,429

(22) Filed: Mar. 22, 2019

(65) Prior Publication Data
US 2020/0303945 A1 Sep. 24, 2020

(51) Int. Cl.
| | | |
|---|---|---|
| *H02J 9/00* | (2006.01) | |
| *H02M 3/156* | (2006.01) | |
| *B60K 28/10* | (2006.01) | |
| *B60W 50/038* | (2012.01) | |
| *H02J 9/06* | (2006.01) | |
| *B60W 50/029* | (2012.01) | |

(52) U.S. Cl.
CPC .............. *H02J 9/002* (2013.01); *B60K 28/10* (2013.01); *B60W 50/038* (2013.01); *H02J 9/06* (2013.01); *H02M 3/156* (2013.01); *B60W 2050/0292* (2013.01); *H02J 9/068* (2020.01)

(58) Field of Classification Search
CPC .. H02J 9/002; H02J 9/06; H02J 9/068; G05D 1/0055; H02M 3/156; H02M 2003/072; B60K 28/10; B60K 2028/006; B60W 2050/0292; B60W 50/038
USPC .......................................................... 307/23
See application file for complete search history.

(56) References Cited

U.S. PATENT DOCUMENTS

| | | | | |
|---|---|---|---|---|
| 5,650,974 | A * | 7/1997 | Yoshimura | G11C 5/141 365/228 |
| 5,796,175 | A * | 8/1998 | Itoh | B60L 3/0023 307/10.1 |
| 5,886,561 | A * | 3/1999 | Eitan | H02J 9/061 307/64 |
| 6,016,045 | A * | 1/2000 | Thomas | H02J 9/061 320/107 |
| 7,872,362 | B2 * | 1/2011 | Kato | H02J 7/1446 290/400 |
| 8,884,460 | B2 * | 11/2014 | Wagner | H02J 7/1423 307/10.1 |
| 10,155,449 | B2 * | 12/2018 | Chen | B60L 11/18 |
| 10,618,479 | B2 * | 4/2020 | Mijac | B60R 16/03 |
| 2012/0261994 | A1 * | 10/2012 | Nikolov | H02J 9/06 307/66 |
| 2020/0143609 | A1 * | 5/2020 | Neelakantan | B60R 16/033 |

* cited by examiner

*Primary Examiner* — Ryan Jager
(74) *Attorney, Agent, or Firm* — Sheppard Mullin Richter & Hampton LLP

(57) ABSTRACT

In general, one or more loads on a vehicle can be connected to both a first voltage source on the vehicle and a backup vehicle power system on the vehicle. If the voltage provided by the first voltage source to the one or more loads satisfies a voltage threshold, the backup vehicle power system does not provide power to the one or more loads. However, if the voltage provided by the first voltage source to the one or more loads falls below the voltage threshold, the backup vehicle power system provides power to the one or more loads.

20 Claims, 10 Drawing Sheets

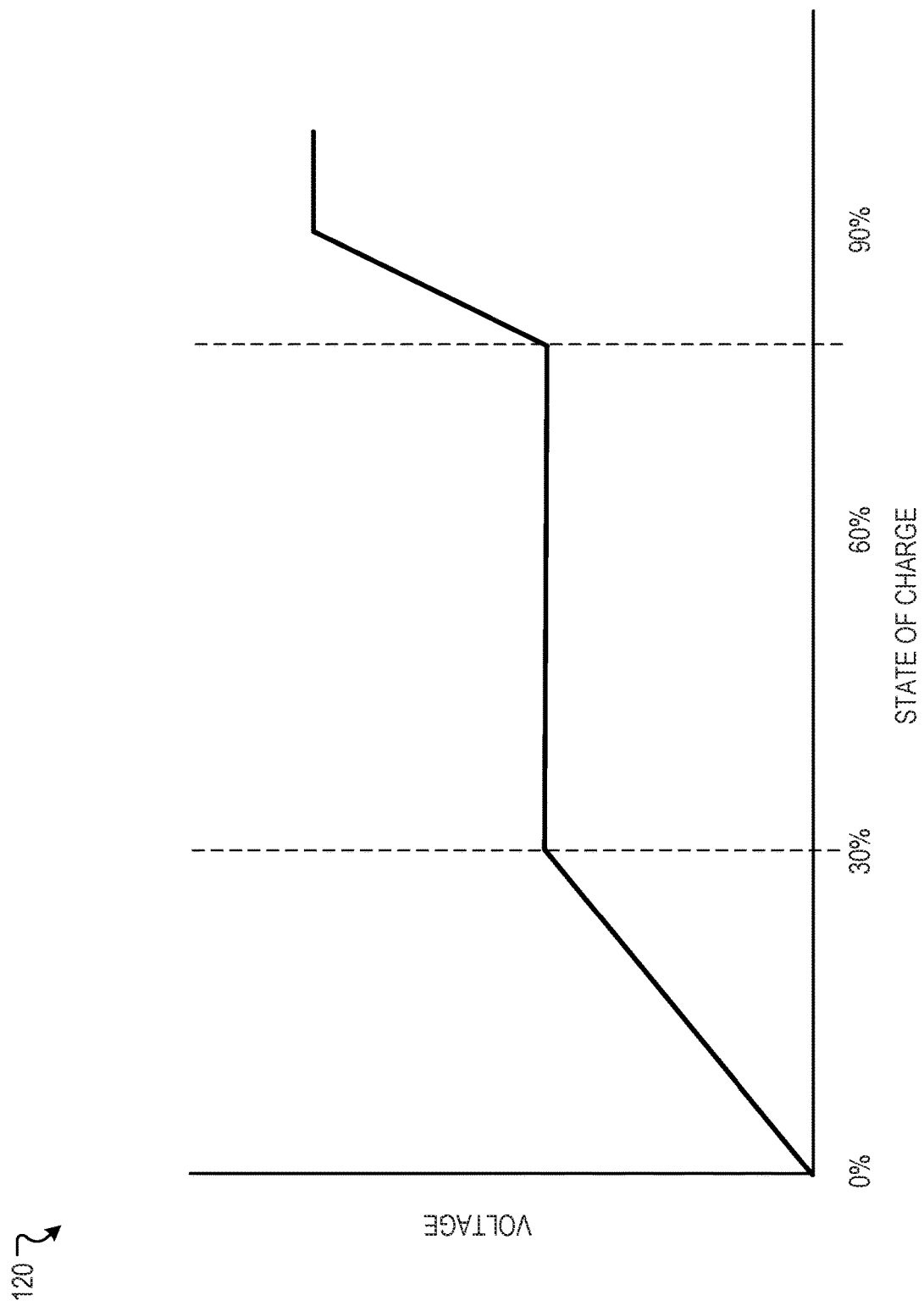

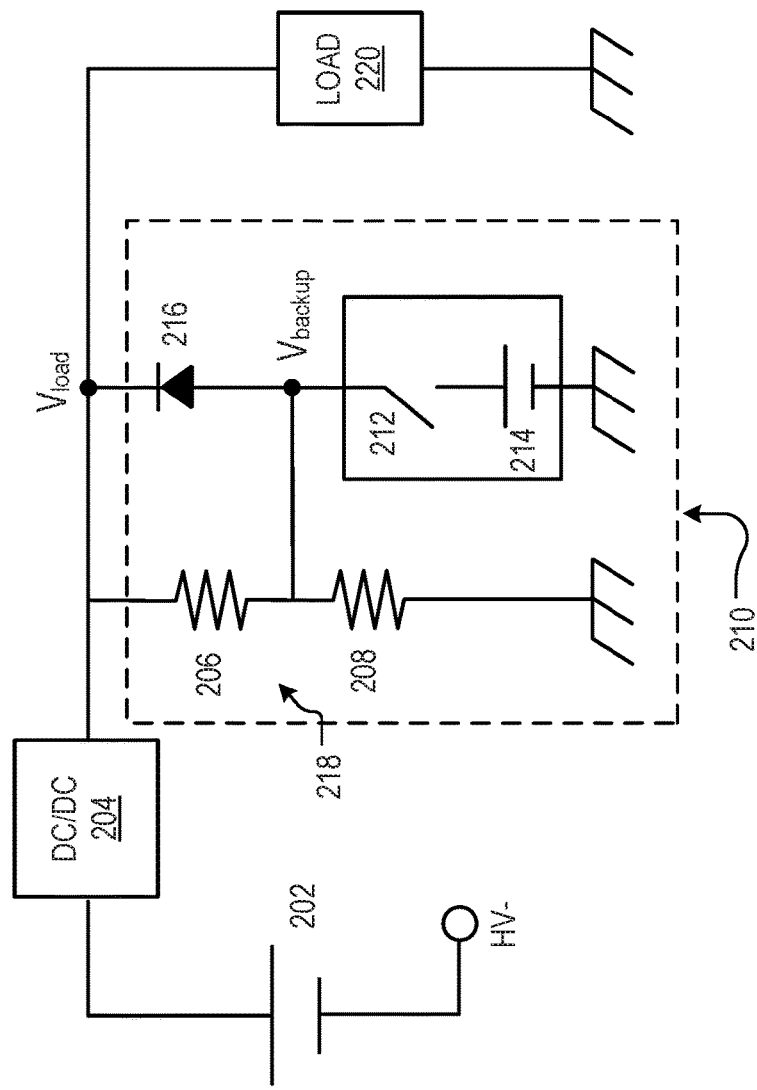

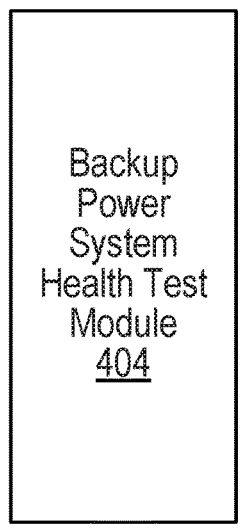
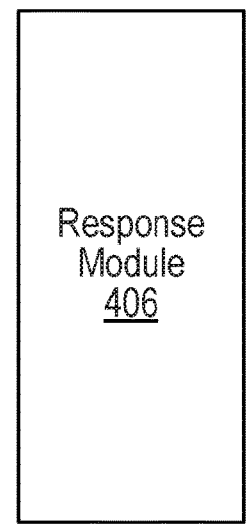
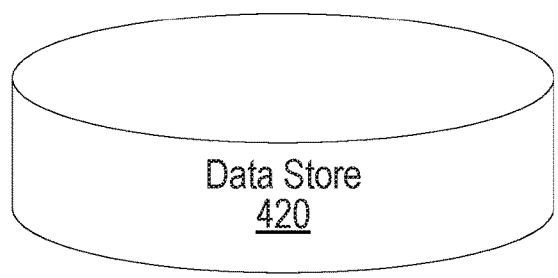
FIGURE 4

500

```
┌─────────────────────────────────────────────────────────────────┐
│ Determine that a voltage at a load has reached a first voltage, │
│ wherein the first voltage is provided to the load from a first  │
│ vehicle voltage source                                          │
│ 502                                                             │
└─────────────────────────────────────────────────────────────────┘
                              ↓
┌─────────────────────────────────────────────────────────────────┐
│ Disconnect the first vehicle voltage source from the load       │
│ 504                                                             │
└─────────────────────────────────────────────────────────────────┘
                              ↓
┌─────────────────────────────────────────────────────────────────┐
│ Determine that the voltage at the load has stayed above a       │
│ threshold voltage for a duration of a test period, wherein the  │
│ threshold voltage is determined based on an expected voltage    │
│ output of a backup vehicle power system                         │
│ 506                                                             │
└─────────────────────────────────────────────────────────────────┘
                              ↓
┌─────────────────────────────────────────────────────────────────┐
│ Determine that the backup vehicle power system is operational   │
│ based on the determination that the voltage at the load has     │
│ stayed above the threshold voltage for the duration of the      │
│ test period                                                     │
│ 508                                                             │
└─────────────────────────────────────────────────────────────────┘
                              ↓
┌─────────────────────────────────────────────────────────────────┐
│ Reconnect the first vehicle voltage source to the load          │
│ 510                                                             │
└─────────────────────────────────────────────────────────────────┘
```

Determine that a voltage at a load has reached a first voltage, wherein the first voltage is provided to the load from a first vehicle voltage source
552

Disconnect the first vehicle voltage source from the load
554

Determine that the voltage at the load has fallen below a threshold voltage, wherein the threshold voltage is determined based on an expected voltage output of a backup vehicle power system
556

Determine that the backup vehicle power system may not be operational based on the determination that the voltage at the load has fallen below the threshold voltage
558

Generate a notification indicating that the backup vehicle power system may not be operational
560

FIGURE 5B

VEHICLE REDUNDANT ENERGY SYSTEM

FIELD OF THE INVENTION

The present technology relates to the field of vehicle power systems. More particularly, the present technology relates to systems, apparatus, and methods for providing, implementing, and testing a backup vehicle power system.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, an autonomous vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

An embodiment of the present disclosure includes a method comprising determining that a voltage at a load has reached a first voltage, wherein the first voltage is provided to the load from a first vehicle voltage source on a vehicle; disconnecting the first vehicle voltage source from the load; determining an operational status of a backup vehicle power system on the vehicle based on observed voltages at the load while the first vehicle voltage source is disconnected from the load; and updating vehicle status information based on the operational status.

In an embodiment, determining the operational status of the backup vehicle power system comprises: determining that a voltage at the load has stayed above a threshold voltage for a duration of a test period, wherein the threshold voltage is determined based on an expected voltage output of the backup vehicle power system, and determining that the backup vehicle power system is operational based on the determination that the voltage at the load has stayed above the threshold voltage for the duration of the test period.

In an embodiment, the duration of the test period is between approximately 1-10 seconds.

In an embodiment, the first vehicle voltage source is reconnected to the load.

In an embodiment, determining the operational status of the backup vehicle power system comprises: determining that a voltage at the load has fallen below a threshold voltage during a test period, wherein the threshold voltage is determined based on an expected voltage output of the backup vehicle power system, and determining that the backup vehicle power system may not be operational based on the determination that the voltage at the load has fallen below the threshold voltage during the test period.

In an embodiment, updating the vehicle status information comprises updating the vehicle status information to indicate that the backup vehicle power system may not be operational.

In an embodiment, a notification is generated indicating that the backup vehicle power system may not be operational.

In an embodiment, the backup vehicle power system comprises a second voltage source.

In an embodiment, the second voltage source is configured to output a voltage that is smaller than a voltage output of the first vehicle voltage source.

In an embodiment, the backup vehicle power system further comprises a diode positioned between the second voltage source and the load. When the first vehicle voltage source provides a voltage to the load that satisfies a second threshold voltage, the diode blocks current flow between the second voltage source and the load. When the first vehicle voltage source fails to provide a voltage to the load that satisfies the second threshold voltage, the diode permits current to flow between the second voltage source and the load.

In an embodiment, determining the operational status of the backup vehicle power system is performed automatically by a vehicle computing system installed on the vehicle each time the vehicle is started.

An embodiment of the present disclosure includes a vehicle system comprising a high-voltage voltage source configured to power a load on a vehicle; and a backup vehicle power system. The backup vehicle power system comprises a second voltage source and a switch configured to permit current flow from the second voltage source to the load if a voltage provided to the load by the high-voltage voltage source falls below a threshold voltage.

In an embodiment, the second voltage source is configured to output a second voltage that is smaller than a voltage output of the high-voltage voltage source.

In an embodiment, the vehicle system further comprises a DC-to-DC converter connected to the high-voltage voltage source. The DC-to-DC converter is configured to convert a high-voltage voltage output of the high-voltage voltage source to a lower-voltage voltage output. The lower-voltage voltage output is used to power the load.

In an embodiment, the backup vehicle power system further comprises a voltage divider between the DC-to-DC converter and the second voltage source.

In an embodiment, the backup vehicle power system further comprises a relay positioned between the voltage divider and the second voltage source. The relay is configured to turn on the second voltage source when an output voltage of the voltage divider falls within a predefined voltage range In an embodiment, the switch comprises a diode positioned between the second voltage source and the load. When the high-voltage voltage source and the DC-to-DC converter provide a voltage to the load that satisfies the threshold voltage, the diode blocks current flow between the second voltage source and the load. When the high-voltage voltage source and the DC-to-DC converter fail to provide a voltage to the load that satisfies the threshold voltage, the diode permits current to flow between the second voltage source and the load In an embodiment, the high-voltage voltage source and the DC-to-DC converter are configured to provide a voltage of approximately 54V to the load.

In an embodiment, the second voltage source is configured to provide a voltage of approximately 48V to the load.

In an embodiment, the load comprises one or more components of a computing system installed on the vehicle.

An embodiment of the present disclosure includes a vehicle power subsystem comprising: a voltage source configured to power a load on a vehicle; a relay coupled to the voltage source; a voltage divider coupled to the relay; and a switch configured to permit current to flow between the voltage source and the load when a high-voltage voltage source and a DC-to-DC converter of the vehicle fail to provide a voltage to the load that satisfies a threshold voltage.

It should be appreciated that many other embodiments, features, applications, and variations of the disclosed technology will be apparent from the accompanying drawings and from the following detailed description. Additional and/or alternative implementations of the systems, methods, and non-transitory computer readable media described herein can be employed without departing from the principles of the disclosed technology.

BRIEF DESCRIPTION OF THE DRAWINGS

FIG. 1B illustrates a graph depicting an example relationship between voltage output and state of charge in a vehicle power system.

FIG. 2 illustrates an example subsystem of a vehicle power system, according to an embodiment of the present technology.

FIG. 4 illustrates an example backup power system health monitoring module, according to an embodiment of the present technology.

FIG. 5A illustrates an example method, according to an embodiment of the present technology.

FIG. 5B illustrates an example method, according to an embodiment of the present technology.

Figure 1A:
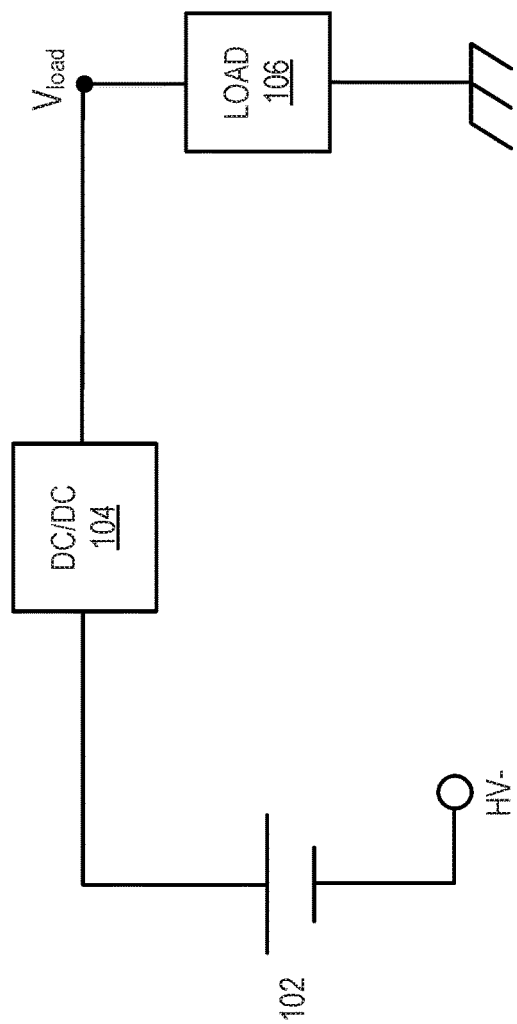
FIG. 1A illustrates a conventional vehicle power system.

The figures depict various embodiments of the disclosed technology for purposes of illustration only, wherein the figures use like reference numerals to identify like elements. One skilled in the art will readily recognize from the following discussion that alternative embodiments of the systems, methods, and non-transitory computer readable media illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, an autonomous vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

Autonomous, semi-autonomous, and manually-driven vehicles may be used by a transportation management system to provide ride services or other types of services. A transportation management system may comprise a fleet of such vehicles. Each vehicle in the fleet may include one or more sensors in a sensor suite. Various loads, such as one or more components of a vehicle computing system (e.g., one or more CPUs, one or more GPUs) and/or one or more sensors in a sensor suite, may be powered by connecting the loads to a voltage source of a vehicle power system. For example, one or more components of a vehicle computing system and/or one or more sensors in a vehicle sensor suite may be powered using a high-voltage battery in the vehicle (e.g., autonomous vehicle). However, the power requirements of such loads may be fairly substantial. For example, a vehicle computing system that is analyzing enormous amounts of data in real-time may require significant power to perform calculations required to safely drive a vehicle. The amount of charge available from a voltage source, such as a high-voltage battery, may fluctuate while a vehicle is being driven. When the amount of charge from a voltage source falls below a lower threshold, the voltage source may not be able to sustain a power output that is sufficient to power all components of the vehicle, some of which may be essential for proper operation of the vehicle. Within the context of a fleet of vehicles, failure to provide sufficient power to sensors or computing systems of the vehicles may represent a significant challenge to maintaining reliable and safe operation. Conventional approaches pose disadvantages in addressing these and other problems.

Figure 1C:
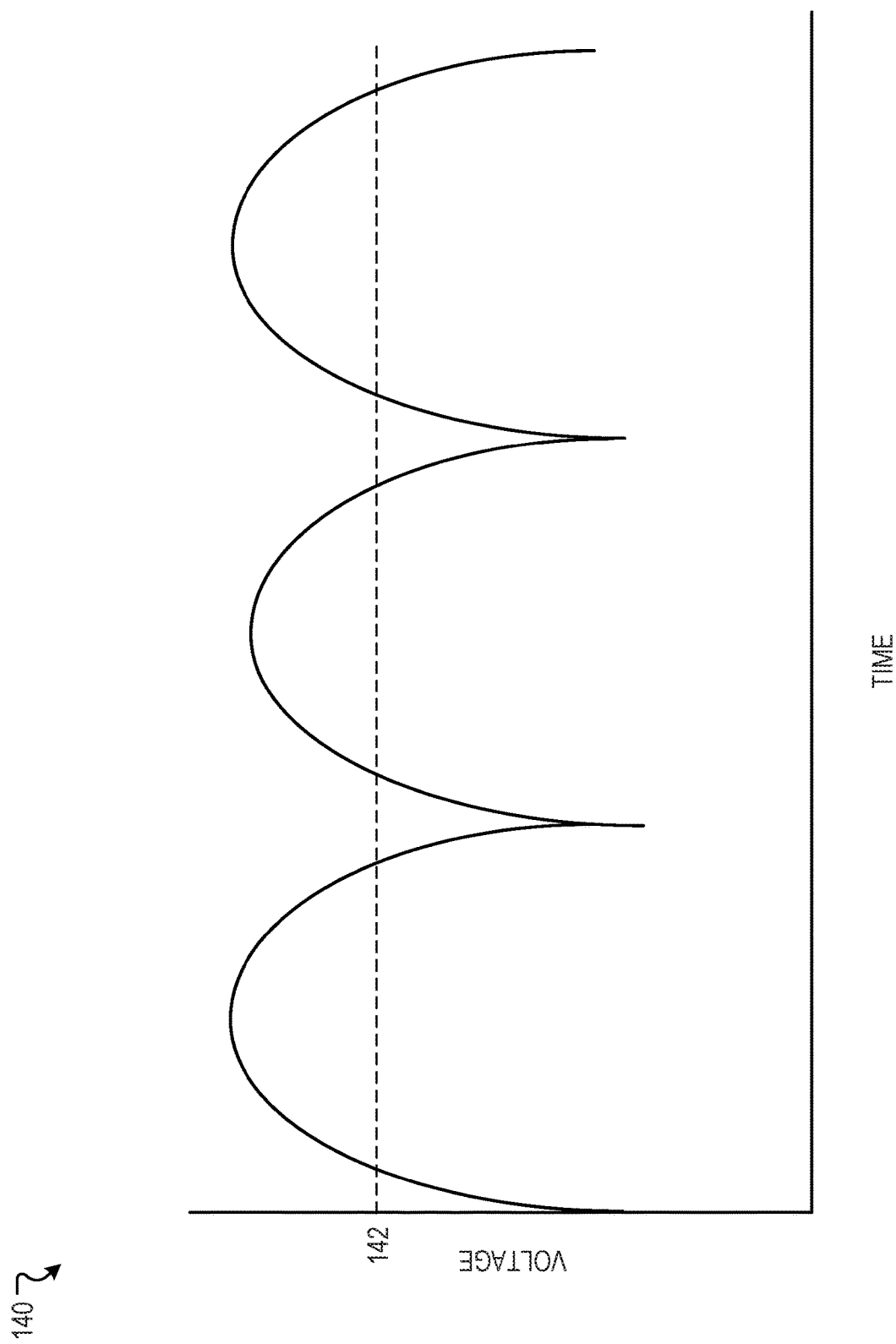
FIG. 1C illustrates a graph demonstrating various challenges that may be experienced using conventional vehicle power systems.

FIG. 1A illustrates an example conventional subsystem 100 of a vehicle power system, and FIGS. 1B and 1C depict example scenarios that are illustrative of various challenges that may be experienced using a conventional vehicle power system. The conventional subsystem 100 includes a voltage source 102. The voltage source 102 may be, for example, a high voltage battery in a vehicle. A DC-to-DC converter 104 converts the voltage of the voltage source 102 to a lower voltage, which may be used to power a load 106. The load 106 may include, for example, one or more components in a vehicle computing system, or one or more sensors in a vehicle sensor suite.

In FIG. 1B, example characteristics typical of a vehicle voltage source, such as the voltage source 102, are depicted. FIG. 1B illustrates a graph 120 which shows voltage output by a voltage source on one axis and state of charge of the voltage source on a second axis. It can be seen in the graph 120 that when the voltage source is charged above a threshold level (in this case, approximately 30% charge), the voltage source is able to output a certain level of voltage (or higher). However, when the charge stored on the voltage source falls below the threshold level (e.g., below 30% charge), the voltage output of the voltage source may fall quickly. Such voltage output characteristics can lead to problematic scenarios, an example of which is depicted in FIG. 1C. In FIG. 1C, the voltage output of a vehicle voltage source is plotted over time on a graph 140. The graph 140 includes a threshold voltage 142, which may represent a minimum voltage required to adequately power one or more components in a vehicle, such as a CPU or a GPU in a vehicle computing system. As discussed above, the level of charge stored in a vehicle voltage source (e.g., a vehicle battery) may fluctuate as the vehicle is driven. If the level of charge in a vehicle voltage source falls below or hovers around a threshold charge level (e.g., approximately 30% charge in FIG. 1B), the voltage output of the voltage source may fluctuate, as shown in FIG. 1C, because the voltage source is unable to maintain a steady voltage output. In FIG. 1C, dips in voltage output may result in periods of time in which the voltage dips below the voltage threshold 142, indicating that certain components may not be receiving sufficient power to operate optimally. As such, conventional vehicle power systems may result in scenarios in which vehicle components are not receiving sufficient power due to a low state of charge on a vehicle voltage source. Underpowered components can lead to dangerous or otherwise undesirable situations in which a vehicle is not able to operate optimally.

An improved approach in accordance with the present technology overcomes the foregoing and other disadvantages associated with conventional approaches. In general, a vehicle power system can include a first voltage source (e.g., a high voltage battery), configured to power one or more loads. The vehicle power system can also include a backup vehicle power system that is configured to maintain a threshold level of voltage output to the one or more loads. For example, the backup vehicle power system can be configured to provide voltage to the one or more loads if voltage output by the first voltage source to the one or more loads fluctuates below a threshold voltage. In certain embodiments, the vehicle power system can also include one or more components that are arranged in a configuration that allows for fast, efficient, and effective testing of the backup vehicle power system to ensure that the backup vehicle power system is operational before operating the vehicle. More details relating to the disclosed technology are provided below.

Figure 6:
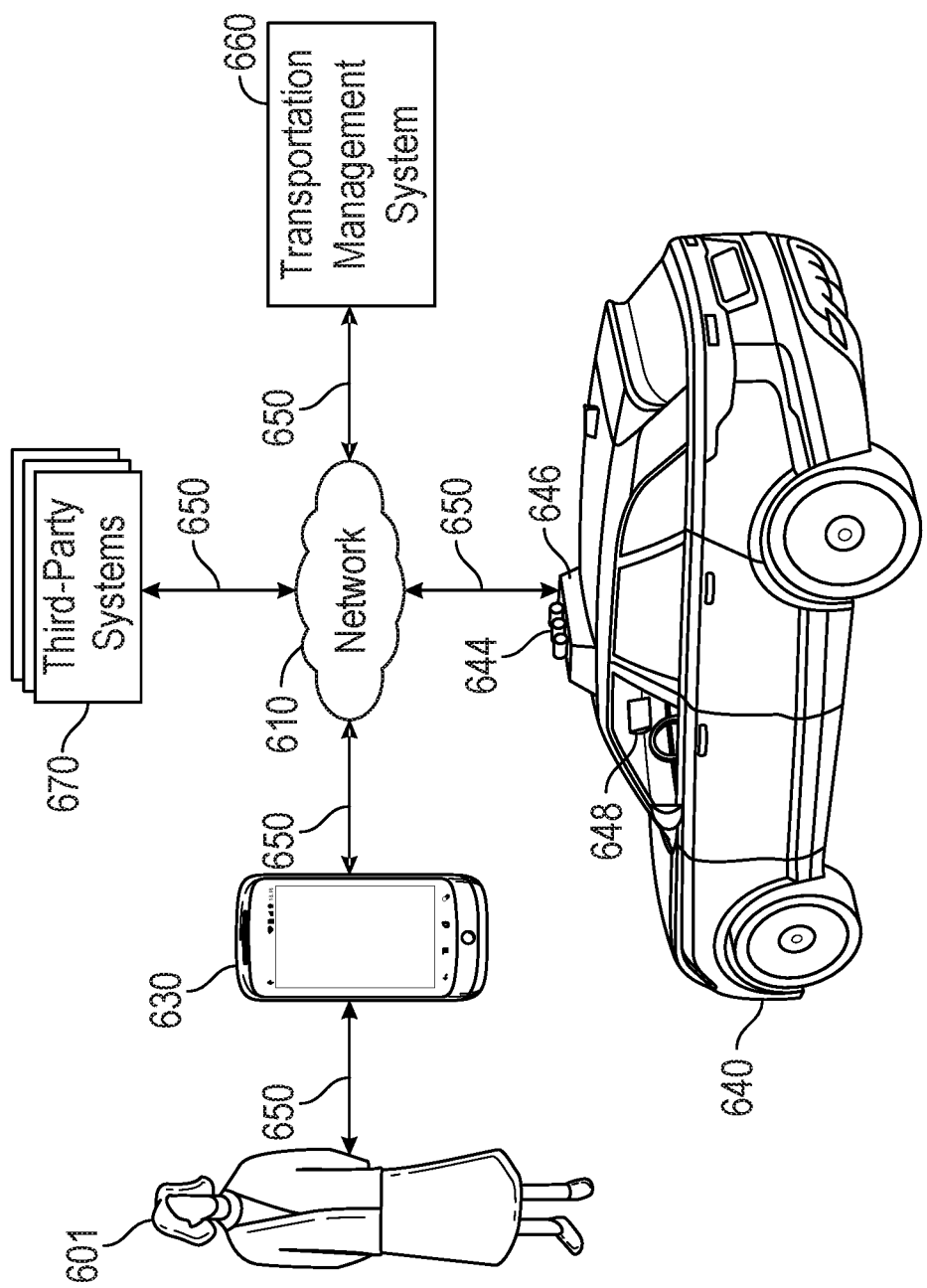
FIG. 6 illustrates an example block diagram of a transportation management environment, according to an embodiment of the present technology.

FIG. 2 illustrates an example of a subsystem 200 of a vehicle power system of a vehicle, according to an embodiment of the present technology. The vehicle can be an autonomous, semiautonomous, or manually-driven vehicle 640 as shown in FIG. 6. In the depicted embodiment, the subsystem 200 includes a high-voltage voltage source 202. In an embodiment, the high-voltage voltage source 202 may be a high-voltage vehicle battery. For example, the high-voltage voltage source 202 may be a 375V battery installed within an autonomous vehicle. The subsystem 200 also includes a DC-to-DC converter 204 to convert the high-voltage voltage source 202 to a lower voltage. In certain embodiments, the DC-to-DC converter may be configured to convert the voltage from the high-voltage voltage source 202 (e.g., 375V) to approximately 54V.

The subsystem 200 includes a load 220 to be powered. The load 220 may include, for example, one or more components in a vehicle computing system (e.g., one or more CPUs and/or one or more GPUs) and/or one or more sensors in a sensor suite. For example, the load 220 may include one or more components of a computing system installed on the vehicle 640 and/or one or more sensors 644 installed on the vehicle 640.

In the subsystem 200, the high-voltage voltage source 202 and the DC-to-DC converter 204 are configured to provide power to the load 220. Voltage delivered to the load 220 is represented by a node $V_{load}$. In one example, as discussed above, the high-voltage voltage source 202 and the DC-to-DC converter 204 may be configured to supply a voltage of approximately 54V to $V_{load}$. However, as mentioned above, voltage output from the high-voltage voltage source 202 may fluctuate depending on a level of charge stored on the high-voltage voltage source 202. As such, if the charge stored on the high-voltage voltage source 202 falls below or hovers around a threshold level of charge, the voltage provided at $V_{load}$ may be inconsistent and may, at certain times, be insufficient to power the load 220. In order to address this problem, and to ensure that the load 220 receives a threshold level of voltage at $V_{load}$, the subsystem 200 includes a backup vehicle power system 210.

The backup vehicle power system 210 includes a second voltage source 214. In certain embodiments, the second voltage source 214 may be configured to output a second voltage that is less than the intended voltage output by the high-voltage voltage source 202 and the DC-to-DC converter 204, but still sufficient to satisfy a threshold level of voltage required by the load 220. For example, the second voltage source 214 may be configured to output approximately 80-90% of the intended voltage output by the high-voltage voltage source 202 and the DC-to-DC converter 204. In a more particular example, if the high-voltage voltage source 202 and the DC-to-DC converter 204 are configured to output a voltage of approximately 54V, the second voltage source 214 and/or the backup vehicle power system 210 may be configured to output a voltage of approximately 48V. In certain embodiments, the second voltage source 214 may be an 8 Ah battery. In certain embodiments, the second voltage source 214 may be capable of powering the load 220 for at least approximately 2-4 minutes or longer.

In the depicted embodiment, the backup vehicle power system 210 includes a voltage divider 218 comprising a high-side resistor 206 and a low-side resistor 208. The voltage between the two resistors in the voltage divider 218 is labeled as $V_{backup}$. In an embodiment, the backup vehicle power system 210 can be configured such that the second voltage source 214 is turned on when voltage at $V_{backup}$ is within a predefined voltage range. For example, a relay 212, connected to $V_{backup}$, can be configured such that when voltage at $V_{backup}$ is determined to fall within a predefined range of voltages, the relay 212 connects the second voltage source 214 and causes the second voltage source 214 to turn on. In one example embodiment, the voltage divider 218 may be an 85% divider, such that when the high-voltage voltage source 202 and the DC-to-DC converter 204 are operating normally by, for example, providing a voltage of 54V at $V_{load}$, the voltage at $V_{backup}$ should be approximately 46V. The relay 212 can be configured to turn on the second voltage source 214 when the voltage at $V_{backup}$ falls within a predefined voltage range, e.g., between 44V-48V. The predefined voltage range may be determined based on characteristics of the voltage divider, and the intended voltage to be provided at $V_{load}$ (e.g., by the high-voltage voltage source 202 and the DC-to-DC converter 204). In this way, the voltage divider 218 and the relay 212 can cause the second voltage source 214 to turn on only if the high-voltage voltage source 202 and the DC-to-DC converter 204 are operating normally. If they are not operating correctly, and their output voltage is not approximately 54V, then the voltage at $V_{backup}$ will fall outside of the predefined voltage range, and the second voltage source 214 will not turn on.

The backup vehicle power system 210 also includes a diode 216 between the second voltage source 214 and $V_{load}$. Using the example values provided above, when the high-voltage voltage source 202 and the DC-to-DC converter 204 are operating normally, the voltage at $V_{load}$ should be approximately 54V, and the voltage at $V_{backup}$ should be approximately 85% of $V_{load}$, i.e., 46V. The positive voltage difference between $V_{load}$ and $V_{backup}$ will cause the diode 216 to reverse bias. As such, current will not flow through the diode 216, and the backup vehicle power system 210 will not provide any voltage to $V_{load}$. However, if the voltage at $V_{load}$ ever falls below a threshold voltage (e.g., falls below the voltage output of the second voltage source 214), then the voltage provided by the second voltage source 214 may exceed the voltage at $V_{load}$. This, in turn, would result in a negative voltage difference between $V_{load}$ and $V_{backup}$, causing the diode 216 to forward bias. In such a state, current will flow through the diode 216, and the backup vehicle power system 210 will provide power to the load 220 at $V_{load}$. In this way, the backup vehicle power system 210 ensures that the voltage to the load 220 ($V_{load}$) never falls below the voltage output of the second voltage source 214. Although the example subsystem 200 is depicted as including a diode 216, it should be understood that the concept of a "diode" can include any switch (e.g., one-way switch), switching circuit, or any other combinations of components that may be configured to perform the equivalent function of the diode 216 discussed above. For example, the concept of a "diode" can include active configurations that may use active circuitry to detect a voltage difference between terminals and control an electronic switch (e.g., a MOSFET) to emulate an ideal diode.

Figure 3:
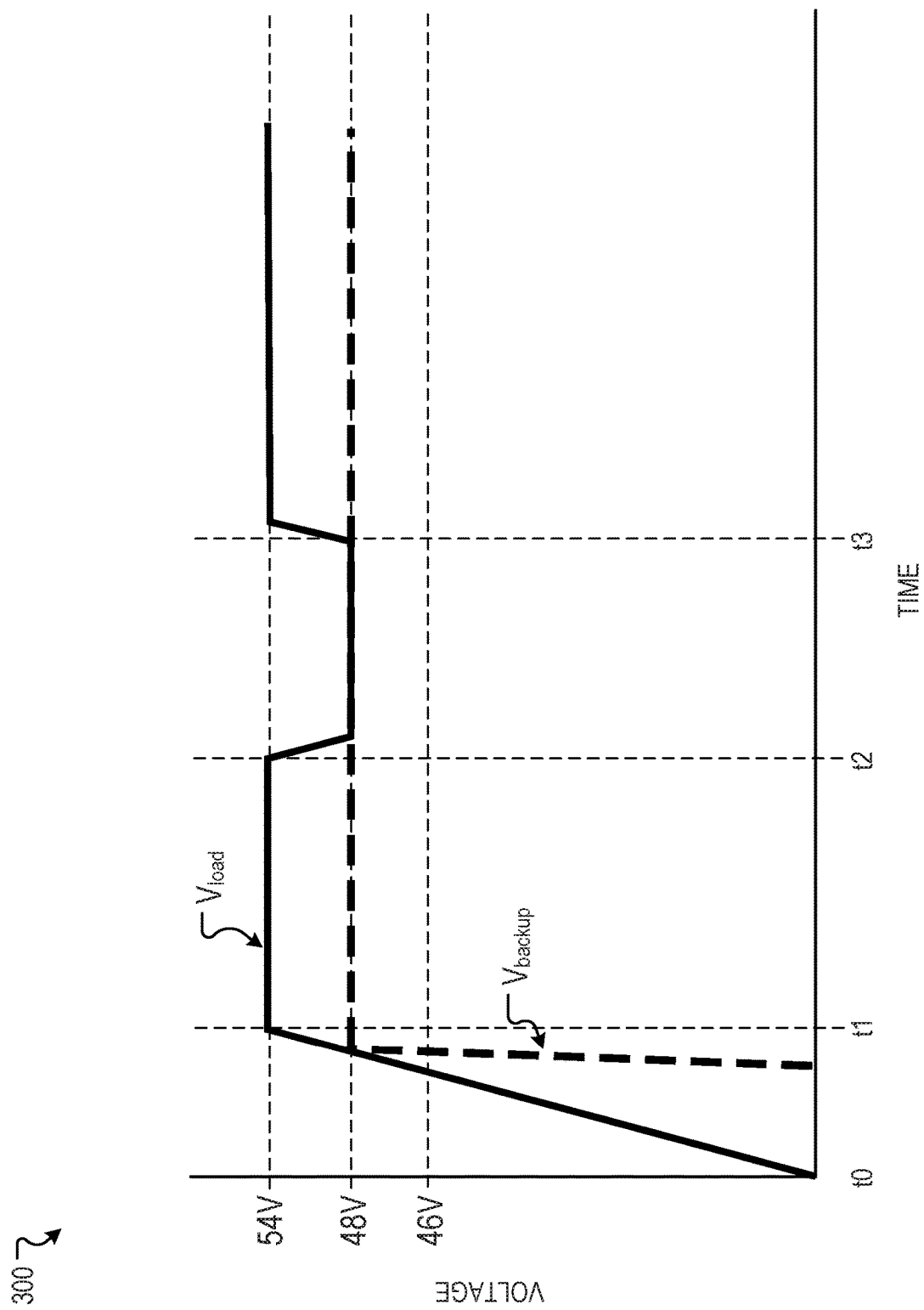
FIG. 3 illustrates a graph depicting exemplary testing of a vehicle backup power system, according to an embodiment of the present technology.

In addition to providing backup power to the load 220, the depicted embodiment also provides a reliable, fast, and cost-effective way to test operability and health of the backup vehicle power system 210. FIG. 3 depicts a graph 300 which demonstrates how the health and operability of the backup vehicle power system 210 can be tested. In the example scenario demonstrated in graph 300, at t0, a vehicle is started, and the high-voltage voltage source 202 of FIG. 2 is turned on. From time t0 to t1, the voltage at $V_{load}$ gradually ramps up from 0V to 54V, the configured output of the high-voltage voltage source 202 and the DC-to-DC converter 204. As the voltage at $V_{load}$ ramps up, the voltage at $V_{backup}$ also ramps up. This, in turn, causes the relay 212 to turn on the second voltage source 214 once the voltage measured at $V_{backup}$ falls within a predefined voltage range (e.g., between 44V to 48V). As such, at time t1, the high-voltage voltage source 202 and the DC-to-DC converter 204 are operating normally, and the backup vehicle power system 210 should theoretically be turned on and ready to provide backup power in the case the high-voltage voltage source 202 fails. In order to test the backup vehicle power system 210, and ensure that it is operating as intended, the high-voltage voltage source 202 can be disconnected from $V_{load}$. This may be done, for example, by turning off the DC-to-DC converter 204. If the backup vehicle power system 210 is working as intended, the voltage at $V_{load}$ should not fall below the voltage output of the second voltage source 214 (e.g., 48V). In the graph 300, at time t2, the DC-to-DC converter 204 is turned off, causing the voltage at $V_{load}$ to drop. However, in the depicted example scenario, the backup vehicle power system 210 is operating normally. As such, the voltage at $V_{load}$ levels off at 48V as the backup vehicle power system 210 and the second voltage source 214 begin providing voltage to $V_{load}$. After confirming that the backup vehicle power system 210 is operating normally, the high-voltage voltage source 202 can be reconnected to $V_{load}$ (e.g., by turning the DC-to-DC converter 204 back on). At time t3, the high-voltage voltage source 202 is reconnected to $V_{load}$, and the voltage increases again to 54V. In certain embodiments, the time between t2, when the high-voltage voltage source 202 is disconnected, and t3, when the high-voltage voltage source 202 is reconnected, may define a test period for testing the health and operability of the backup vehicle power system 210. In various embodiments, the test period may be between 1-10 seconds (e.g., approximately 5 seconds). If the voltage at $V_{load}$ remains above a threshold voltage value for the duration of the test period, a determination can be made that the backup vehicle power system 210 is operating normally. The threshold voltage value may be determined based on the expected voltage output of the second voltage source and/or the backup vehicle power system. For example, if it is known that the second voltage source should output a voltage of approximately 48V, the threshold voltage can be set to approximately 47V or 46V or 45V.

If, for some reason, the backup vehicle power system 210 was not operating normally, then the voltage at $V_{load}$ could fall below 48V when the high-voltage voltage source 202 is disconnected. For example, if the backup vehicle power system 210 was not providing any backup power, the voltage may fall all the way to 0V. If it is determined that the voltage at $V_{load}$ has fallen below the threshold voltage value during the test period, then a determination can be made that the backup vehicle power system 210 is not operating correctly. In certain embodiments, a notification or a warning can be generated to notify a user that the backup vehicle power system 210 may not be operating correctly. In certain embodiments, testing of the backup vehicle power system 210 may be automatically carried out each time a vehicle is started in order to ensure that the backup vehicle power system 210 is operational.

FIG. 4 illustrates an example system 400 including an example backup power system health monitoring module 402, according to an embodiment of the present technology. As shown in the example of FIG. 4, the backup power system health monitoring module 402 can include a backup power system health test module 404 and a response module 406. In some instances, the example system 400 can include at least one data store 420. The components (e.g., modules, elements, etc.) shown in this figure and all figures herein are exemplary only, and other implementations may include additional, fewer, integrated, or different components. Some components may not be shown so as not to obscure relevant details. In some embodiments, some or all of the functionality performed by the backup power system health monitoring module 402 and its sub-modules may be performed by one or more backend computing systems, such as a transportation management system 660 of FIG. 6. In some embodiments, some or all of the functionality performed by the backup power system health monitoring module 402 and its sub-modules may be performed by one or more computing systems implemented in a vehicle, such as a vehicle 640 of FIG. 6.

The backup power system health monitoring module 402 can be configured to communicate and operate with the at least one data store 420, as shown in the example system 400. The at least one data store 420 can be configured to store and maintain various types of data. For example, the data store 420 can store voltage threshold, historical test results, and the like. In some embodiments, some or all data stored in the data store 420 can be stored by the transportation management system 660 of FIG. 6. In some embodiments, some or all data stored in the data store 420 can be stored by the vehicle 640 of FIG. 6. More details about information that can be stored in the data store 420 are provided below.

The backup power system health test module 404 can be configured to test the health and operability of a backup vehicle power system, such as the backup vehicle power system 210 of FIG. 2. In certain embodiments, a first vehicle voltage source, such as the high-voltage voltage source 202 of FIG. 2, can be configured to provide power to one or more loads on a vehicle, such as the load 220 of FIG. 2. Furthermore, a backup vehicle power system, such as the backup vehicle power system 210 of FIG. 2, can be configured to provide backup power to the one or more loads should the first vehicle voltage source fail to provide a threshold level of voltage to the one or more loads. In an embodiment, the backup power system health test module 404 can be configured to determine that a voltage at the one or more loads has reached a first voltage. The first voltage may be associated with the first vehicle voltage source. For example, if the high-voltage voltage source 202 and the DC-to-DC converter 204 are configured to provide 54V of voltage to the load 220, the backup power system health test module 404 can determine that the voltage at the load 220 has reached approximately 54V (or a lower threshold voltage that is slightly lower than 54V). In order to test the backup vehicle power system, the backup power system health test module 404 can disconnect the first vehicle voltage source from the one or more loads. For example, in FIG. 2, the backup power system health test module 404 can turn off the DC-to-DC converter 204. The backup power system health test module 404 can monitor the voltage at the one or more loads to determine whether or not the backup vehicle power system is operational. If, during a test period, the voltage at the one or more loads does not fall below a voltage threshold, then a determination can be made that the backup vehicle power system is operational. For example, if the voltage at the one or more loads levels off at a second voltage that is associated with the backup vehicle power system, then it can be determined that the backup vehicle power system is successfully providing backup power to the one or more loads. However, if, during the test period, the voltage at the one or more loads falls below the voltage threshold, a determination can be made that the backup vehicle power system may not be operating correctly.

The response module 406 can be configured to generate a response based on the determination made by the backup power system health test module 404. If the backup power system health test module 404 determines that the backup vehicle power system is operating normally, the response module 406 can reconnect the first vehicle voltage source to the one or more loads, and the vehicle may be operated. However, if the backup power system health test module 404 determines that the backup vehicle power system may not be operating normally, the response module 406 can, for example, generate a notification or a report indicating that the backup vehicle power system may not be operating normally. For example, the notification may be transmitted to a person or system charged with maintaining optimal operation of the vehicle or presented on a display in the vehicle to indicate that the vehicle needs attention. In an embodiment, generating the response based on the determination made by the backup power system health test module 404 can comprise updating vehicle status information. For example, if the backup power system health test module 404 determines that the backup vehicle power system is operating normally, the response module 406 can update vehicle status information to indicate that the backup vehicle power system is operating normally. If the backup power system health test module 404 determines that the backup vehicle power system is not operating normally, the response module 406 can update vehicle status information to indicate that the backup vehicle power system is not operating normally.

FIG. 5A illustrates an example method 500, according to an embodiment of the present technology. At block 502, the method 500 can determine that a voltage at a load has reached a first voltage, wherein the first voltage is provided to the load from a first vehicle voltage source. At block 504, the method 500 can disconnect the first vehicle voltage source from the load. At block 506, the method 500 can determine that the voltage at the load has stayed above a threshold voltage for a duration of a test period, wherein the threshold voltage is determined based on an expected voltage output of a backup vehicle power system. At block 508, the method 500 can determine that the backup vehicle power system is operational based on the determination that the voltage at the load has stayed above the threshold voltage for the duration of the test period. At block 510, the method 500 can reconnect the first vehicle voltage source to the load. Many variations to the example method are possible. It should be appreciated that there can be additional, fewer, or alternative steps performed in similar or alternative orders, or in parallel, within the scope of the various embodiments discussed herein unless otherwise stated.

FIG. 5B illustrates an example method 550, according to an embodiment of the present technology. At block 552, the method 550 can determine that a voltage at a load has reached a first voltage, wherein the first voltage is provided to the load from a first vehicle voltage source. At block 554, the method 550 can disconnect the first vehicle voltage source from the load. At block 556, the method 550 can determine that the voltage at the load has fallen below a threshold voltage, wherein the threshold voltage is determined based on an expected voltage output of a backup vehicle power system. At block 558, the method 550 can determine that the backup vehicle power system may not be operational based on the determination that the voltage at the load has fallen below the threshold voltage. At block 560, the method 550 can generate a notification indicating that the backup vehicle power system may not be operational. Many variations to the example method are possible. It should be appreciated that there can be additional, fewer, or alternative steps performed in similar or alternative orders, or in parallel, within the scope of the various embodiments discussed herein unless otherwise stated.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the backup power system health monitoring module 402 may be implemented by one or more computing systems of the transportation management system 660. In some embodiments, some or all modules of the backup power system health monitoring module 402 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
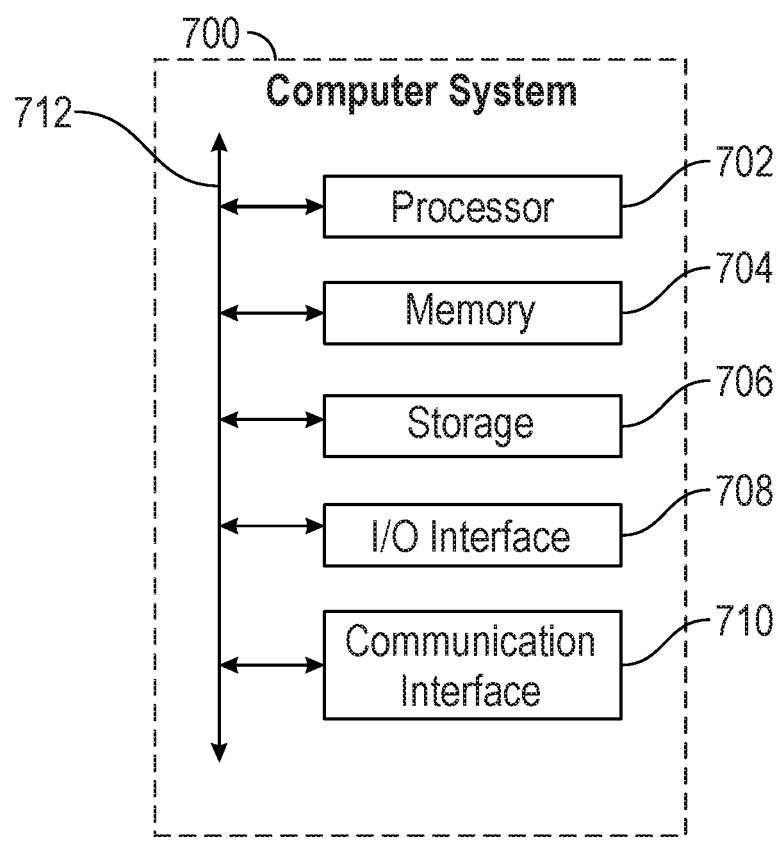
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   determining that a first voltage at a load reaches a predefined voltage amount, wherein the first voltage is provided to the load from a vehicle voltage source on a vehicle;
   subsequent to determining that the first voltage has reached the predefined voltage amount, disconnecting the vehicle voltage source from the load;
   determining an operational status of a backup vehicle power system on the vehicle based on monitoring a second voltage at the load while the vehicle voltage source is disconnected from the load, wherein determining the operational status of the backup vehicle power system comprises:
      determining whether the second voltage that is monitored at the load is less than a threshold voltage amount during a test period that is based on an expected voltage output of the backup vehicle power system during the test period; and
   updating vehicle status information based on the operational status.

2. The method of claim 1, wherein determining the operational status of the backup vehicle power system further comprises:
   determining that the second voltage that is monitored at the load is greater than or equal to the threshold voltage amount for a duration of the test period, and
   determining that the backup vehicle power system is operational based on the determination that the second voltage that is monitored at the load is greater than or equal to the threshold voltage amount for the duration of the test period.

3. The method of claim 2, further comprising reconnecting the vehicle voltage source to the load.

4. The method of claim 2, wherein determining the operational status of the backup vehicle power system further comprises:
   determining that the second voltage that is monitored at the load is less than the threshold voltage amount during the test period, and
   determining that the backup vehicle power system may not be operational based on the determination that the second voltage that is monitored at the load is less than the threshold voltage amount during the test period.

5. The method of claim 4, wherein updating the vehicle status information comprises updating the vehicle status information to indicate that the backup vehicle power system may not be operational.

6. The method of claim 4, further comprising generating a notification indicating that the backup vehicle power system may not be operational.

7. The method of claim 1, wherein the second voltage source is coupled to a voltage divider.

8. The method of claim 1, wherein the backup vehicle power system comprises a second voltage source.

9. The method of claim 8, wherein the second voltage source is configured to output a voltage that is less than the voltage provided by the first vehicle voltage source.

10. The method of claim 8, wherein the backup vehicle power system further comprises a diode positioned between the second voltage source and the load, wherein
    when the vehicle voltage source provides a voltage to the load that satisfies a second threshold voltage amount, the diode blocks current flow between the second voltage source and the load, and
    when the first vehicle voltage source fails to provide a voltage to the load that satisfies the second threshold voltage amount, the diode permits current to flow between the second voltage source and the load.

11. A vehicle system comprising:
    a first voltage source configured to provide a voltage to a load on a vehicle; and
    a backup vehicle power system, wherein the backup vehicle power system comprises
       a second voltage source,
       a voltage divider coupled to the second voltage source; and
       a switch configured to cause current to flow from the second voltage source to the load in response to the voltage provided to the load by the first voltage source falling below a threshold voltage amount.

12. The vehicle system of claim 11, wherein the second voltage source is configured to output a second voltage that is less than the voltage provided to the load by the first voltage source.

13. The vehicle system of claim 11, wherein a relay is positioned between a diode and the second voltage source of the backup vehicle power system.

14. The vehicle system of claim 13, wherein the relay is positioned between the voltage divider and the second voltage source.

15. The vehicle system of claim 13, wherein the relay is configured to turn on the second voltage source in response to an output voltage of the voltage divider falling within a predefined voltage range, the predefined voltage range based on the voltage divider and an intended voltage to be provided at the load.

16. The vehicle system of claim 11, wherein the voltage divider is coupled to a converter that is a DC-to-DC converter connected to the first voltage source, wherein the DC-to-DC converter is configured to convert a high-voltage voltage output of the first voltage source to a lower-voltage voltage output, wherein the lower-voltage voltage output is used to power the load.

17. The vehicle system of claim 16, wherein the switch comprises a diode positioned between the second voltage source and the load, and wherein
when the first voltage source and the DC-to-DC converter provide a voltage to the load that satisfies the threshold voltage amount, the diode blocks current flow between the second voltage source and the load, and
when the first voltage source and the DC-to-DC converter fail to provide a voltage to the load that satisfies the threshold voltage amount, the diode permits current to flow between the second voltage source and the load.

18. The vehicle system of claim 11, wherein the voltage at the load does not fall below a second voltage that is output by the second voltage source.

19. The vehicle system of claim 11, wherein the load comprises one or more components of a computing system installed on the vehicle.

20. A vehicle power subsystem comprising:
a first voltage source configured to power a load of a vehicle;
a relay coupled to the first voltage source;
a voltage divider coupled to the relay; and
a switch configured to permit current to flow between the first voltage source and the load when a second voltage source and a DC-to-DC converter of the vehicle fail to provide a voltage to the load that satisfies a threshold voltage.

* * * * *